(12) United States Patent
Joshi (10) Patent No.: US 6,732,046 B1
(45) Date of Patent: May 4, 2004

(54) APPLICATION OF THE HOUGH TRANSFORM TO MODELING THE HORIZONTAL COMPONENT OF ROAD GEOMETRY AND COMPUTING HEADING AND CURVATURE

(75) Inventor: Rajashri Joshi, Chicago, IL (US)

(73) Assignee: Navigation Technologies Corp., Chicago, IL (US)

(*) Notice: Subject to any disclaimer, the term of this patent is extended or adjusted under 35 U.S.C. 154(b) by 177 days.

(21) Appl. No.: 09/970,265

(22) Filed: Oct. 3, 2001

(51) Int. Cl.[7] .................................................. G06G 6/00

(52) U.S. Cl. ........................ 701/208; 701/206; 707/102; 707/103; 345/442

(58) Field of Search ................................. 701/208, 200, 701/201, 203, 206; 707/102, 103, 104; 340/988, 990; 345/442, 443

(56) References Cited

U.S. PATENT DOCUMENTS

| | | | | |
|---|---|---|---|---|
| 3,069,654 A | | 12/1962 | Hough .......................... 382/281 |
| 5,172,317 A | * | 12/1992 | Asanuma et al. ............... 701/28 |
| 5,233,527 A | * | 8/1993 | Shinnosuke ..................... 701/28 |
| 5,243,524 A | | 9/1993 | Ishida et al. ..................... 701/28 |
| 6,029,173 A | * | 2/2000 | Meek et al. ................... 707/102 |
| 6,265,991 B1 | * | 7/2001 | Nishiwaki et al. ............. 340/903 |
| 6,266,442 B1 | | 7/2001 | Laumeyer et al. ............. 382/190 |

OTHER PUBLICATIONS

Innes, J.D., The Engineering or Roads (4 pages) (2001), http://www.unb.ca/web/transpo/mynet/mtu74.htm.

Air Force Joint Pamphlet, Planning and Design of Roads, Airfield, and Heliports in the Theater of Operations—Road Design, Field Manual No. 5–430–00–1, No. 32–8013, vol. 1 (1994) http://www.adtdl.army.mil/cgi–bin/atdl.dll/fm/5–430–00–1/CH9.htm.

Fisher, Robert B., "Feature Space Transmission for line detection," Available in Cvonline Compendium of Computer Vision, (2001) http://www.dai.ed.ac.uk/cVouline.

Vandegrift, C.J., et al., Unit 7: Route Surveying, LS/LSIT Video Exam preparation course workbook, Caltrans Geometronics (1993).

* cited by examiner

Primary Examiner—Thomas G. Black
Assistant Examiner—Arthur D. Donnelly
(74) Attorney, Agent, or Firm—Frank J. Kozak; Jon D. Shutter; Lawrence M. Kaplan (57) ABSTRACT

The Hough Transform is used to identify the circular arcs and straight line segments that coincide with the horizontal curves of roads. The Hough Transform uses data indicating positions along the roads as an input in order to identify the circular arcs and straight line segments that coincide with the roads. Data indicating the circular arcs and straight line segments are stored in a geographic database and are used to represent the roads. Radius of curvature of the road is obtained as a by product of this representation. Because the Hough Transform yields a closed form representation of road segments, the heading at any point along a road can be computed by computing the tangent to the closed form representation. Thus, heading can be accurately obtained at any point along a road.

14 Claims, 7 Drawing Sheets

APPLICATION OF THE HOUGH TRANSFORM TO MODELING THE HORIZONTAL COMPONENT OF ROAD GEOMETRY AND COMPUTING HEADING AND CURVATURE

REFERENCE TO RELATED APPLICATION

The present application is related to the copending application entitled "METHOD FOR REPRESENTING THE VERTICAL COMPONENT OF ROAD GEOMETRY AND COMPUTING GRADE OR SLOPE", Ser. No. 09/970,233, Oct. 3, 2001, filed on even date herewith, the entire disclosure of which is incorporated herein by reference.

BACKGROUND OF THE INVENTION

The present invention relates generally to geographic databases and, more particularly, the present invention relates to a new way to represent roads in geographic databases and methods for forming such representations.

Geographic databases have many uses. Geographic databases are used in navigation systems to display maps and provide route calculation and guidance. Geographic databases are also used by Internet sites to provide navigation-related features and services.

In many conventional geographic databases, a linearly extending geographic feature, such as a road, a river, or a state or municipal boundary, is represented using a series of discrete points. For example, in the case of roads, each road segment is represented by two nodes that represent the end points of the road segment, and optionally by one or more shape points that represent points along the road segment between the two nodes. Data that define each of these points (e.g., latitude, longitude, and optionally altitude) are stored in the geographic database to represent the road segment.

Although this way of representing roads and other linearly extending geographic features works well for many applications, there is room for improvement. One area in which there exists a need for improvement relates to the amount of data needed to accurately represent a road. If a road is curved, a large number of shape points may be needed to accurately represent the actual shape of the road. Storing large numbers of shape points increases the overall size of the geographic database thereby increasing the cost of the data storage medium. Increasing the overall size of the geographic database may also require that systems that use the geographic database have faster and more powerful processors or more memory.

Accordingly, there is a need for a space efficient model for representing and storing the geometry of linearly extending geographic features, in particular roads.

SUMMARY OF THE INVENTION

To address these and other objectives, the present invention provides a use of the Hough Transform to identify the circular arcs and straight line segments that coincide with the horizontal component of roads. The Hough Transform uses data indicating positions along the roads as an input in order to identify the circular arcs and line segments that coincide with the roads. Data describing the circular arcs and line segments are stored in a geographic database and are used to represent the roads.

The data, indicating the horizontal component of positions along roads, which are provided as an input to the Hough Transform, may be obtained from a positioning system located in a vehicle that is driven along roads, or alternatively, the data may be obtained from other sources such as by digitizing paper maps or imagery.

The use of circular arcs and line segments to represent the horizontal component of roads may be advantageous for certain applications that require an accurate representation of road geometry. Such a representation may be a space efficient way to represent roads with a high level of accuracy, because the representation directly exploits the circular arc spline design of roads.

DETAILED DESCRIPTION OF THE PRESENTLY PREFERRED EMBODIMENTS

I. Introduction

Figure 1A:
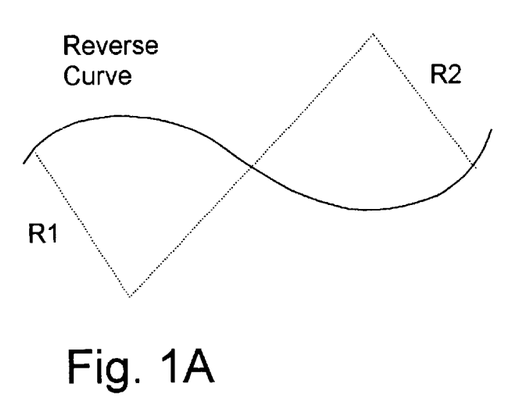
FIGS. 1A and 1B illustrate how roads are composed of combinations of circular arcs and straight line segments.
Figure 1B:
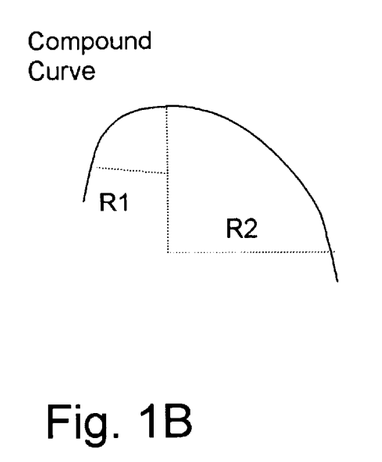

The horizontal curves of roads are designed by highway engineers using circular arcs and straight line segments connected end to end in various combinations. (In some countries, planar spiral curves called Euler spirals or clothoids are used to provide a continuously variable radius of curvature for connecting straight and curved road segments to each other without loss of continuity.) Therefore, roads are piecewise circular, i.e., a road can be considered to be a circular arc spline (since a straight line segment is simply a circular arc of infinite radius of curvature). Two examples of such road segments are shown in FIG. 1.

Those who develop geographic databases that represent roads have a need for ways to accurately represent the shape, i.e., curvature, of roads. Likewise, those who use geographic database products that represent roads have an interest in how accurately the shapes of roads are represented. Applications like adaptive cruise control and adaptive lighting control use the radius of curvature of the road segment on which a vehicle is traveling to vary a parameter, viz., vehicle speed in the case of adaptive cruise control and headlight angle in the case of adaptive lighting control.

Prior methods of computing curvature of road geometry have been based on fitting a polynomial function to the shape points or by using some approximation of curvature such as the three point method. Although these prior methods may work well for many applications, these methods do not necessarily take advantage of the circular arc spline nature of road geometry.

A present embodiment includes a method for computing a circular arc spline model of the horizontal component of road geometry and exploiting the piecewise circular design of road geometry to obtain an accurate measure of radius of curvature. (The horizontal component of road geometry refers to the latitudinal and longitudinal variation of the road shape, as opposed to any variation in the altitude.) The present embodiment uses the Hough Transform as part of a process to represent roads as circular arc splines.

II. The Hough Transform

The Hough Transform is a known technique for detecting straight lines or simple curves (such as circular arcs) within an image. (It can also be extended to other shapes, to some extent). The Hough Transform is described in U.S. Pat. No. 3,069,654. The Hough Transform is used in object recognition (road sign detection, etc. ...), pattern recognition, and other areas.

In the case of line detection, the Hough Transform will find all parameter pairs (m,c) which describe each line segment y=mx+c occurring in the image, where m is slope and c is the y-intercept. In the case of circle detection, the Hough Transform will find all parameter triplets (a,b,r) which describe each circle (or arc) $(x-a)^2+(y-b)^2=r^2$ occurring in the image, where (a,b) is the center, and r is the radius. The Hough Transform is directly applicable to detecting line segments and circular arcs in road geometry.

Use of the Hough Transform to Detect a Line in the x-y Plane

Figure 2:
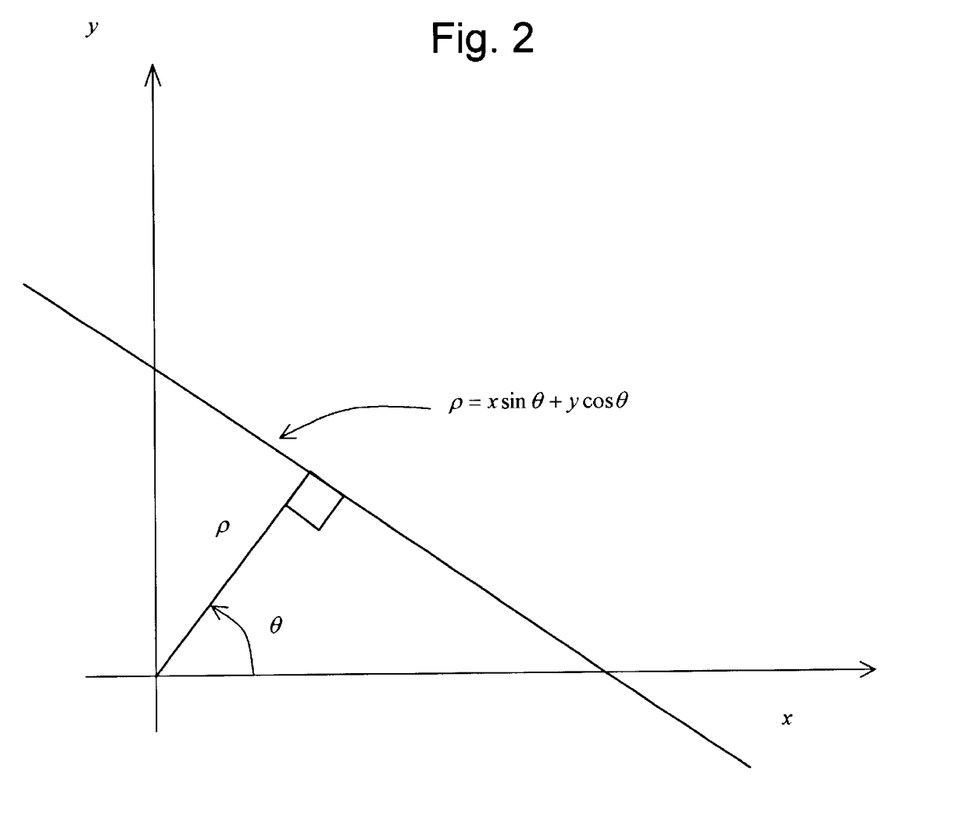
FIG. 2 is a graph that illustrates the Line Hough Transform.
Figure 3A:
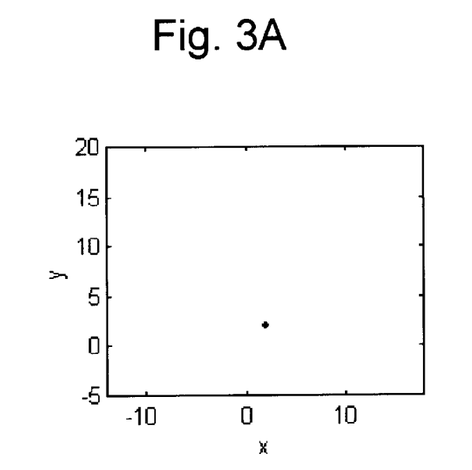
FIGS. 3A–3D are more graphs that illustrate the Line Hough Transform.
Figure 3B:
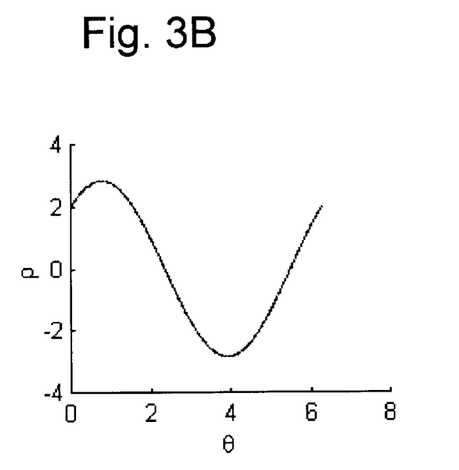
Figure 3C:
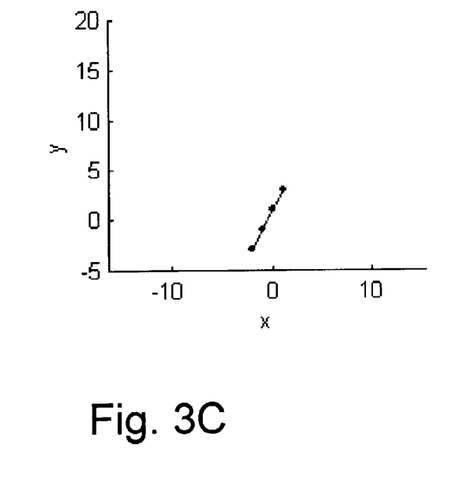
Figure 3D:
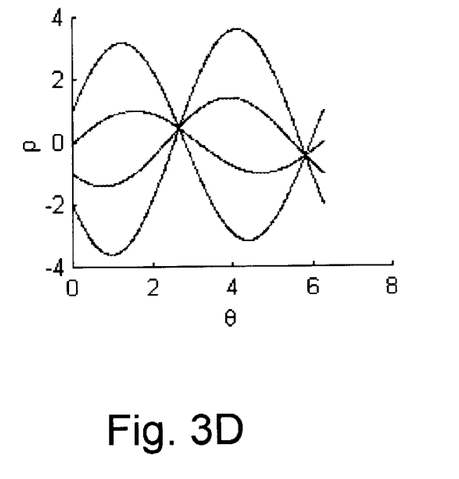

Note that for any point (x, y) in the x-y plane, an infinite number of lines can be drawn through that point, each with a different slope and y-intercept as shown in FIG. 2.

The equation of any one of these lines is $$y=mx+c \tag{1}$$

However, since m and c can take on a value of ±∞, it is more convenient to write the equation of the line in parametric form as follows:

$$\rho = x \cos\theta + y \sin\theta \tag{2}$$

where θ is the angle made with the x-axis by the normal through the origin to the line and ρ is the length of the normal, as shown in FIG. 3. The relationship between (ρ,θ) and (m,c) is given below:

$$\theta = \frac{\pi}{2} - \tan^{-1}(m) \tag{3}$$

$$\rho = \frac{c}{\sqrt{m^2+1}} \tag{4}$$

Each parameter pair (ρ,θ) defines a unique line in the x-y plane. Each point in the x-y plane maps to a sinusoid in the ρ-θ plane, i.e., if we plot in the ρ-θ plane, each pair (ρ,θ) which defines a line through the point (x,y), the resulting curve is a sinusoid. The Line Hough Transform of a point in the x-y plane is thus a sinusoid in the ρ-θ plane. Points in the ρ-θ plane where sinusoids intersect correspond to the existence of a single line in the x-y plane. In practice, the intersection points are detected using an accumulator, which divides the $(x-a)^2+(y-b)^2=r^2$ plane into a grid. Each point in the x-y, plane produces a vote in a cell in the accumulator. Cells with a large number of votes correspond to an intersection point, which means that a line segment is present in the image in the x-y plane.

Use, of the Hough Transform to Detect a Circle of Radius r in the x-y Plane

Note that for any point (x,y) in the x-y plane, an infinite number of circles of radius r can be drawn through that point, each with a different center (a,b), as shown in FIG. 2A.

The equation of any one of these circles is $$(x-a)^2+(y-b)^2=r^2 \tag{5}$$

where (a,b) is the center of the circle and r is the radius.

Figure 4A:
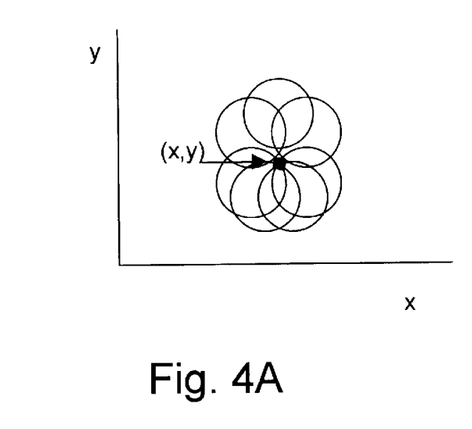
FIGS. 4A and 4B are graphs that illustrate the Circle Hough Transform.
Figure 4B:
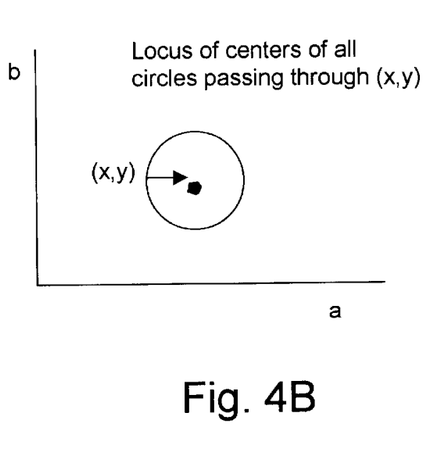

If the locus of all of these center points (a,b) is plotted in the a-b plane, it turns out that this locus is also a circle (in the a-b plane). This can be verified from FIG. 4B or by noting that Equation (5) can be rewritten as $$(a-x)^2+(b-y)^2=r^2 \tag{6}$$

which can be viewed as the equation of a circle in the a-b plane with radius r and center (x, y). Each point (a,b) on this circle is the mapping of a single circle in the x-y plane with center (a,b) and which passes through (x,y). The entire circle in the a-b plane is therefore the mapping of all of the circles in the x-y plane which pass through the point (x, y). The Circle Hough Transform of a point in the x-y plane is thus a circle in the a-b plane.

Figure 5A:
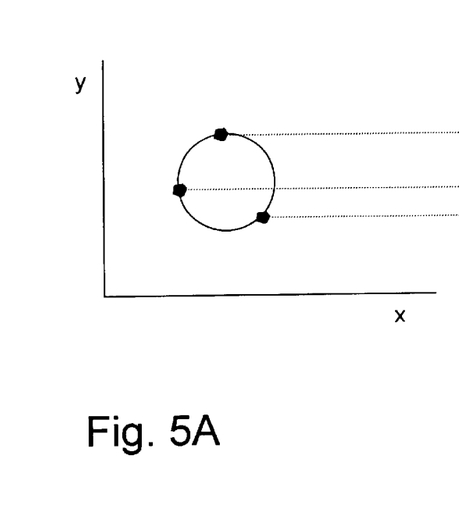
FIGS. 5A and 5B are more graphs that illustrate the Circle Hough Transform.
Figure 5B:
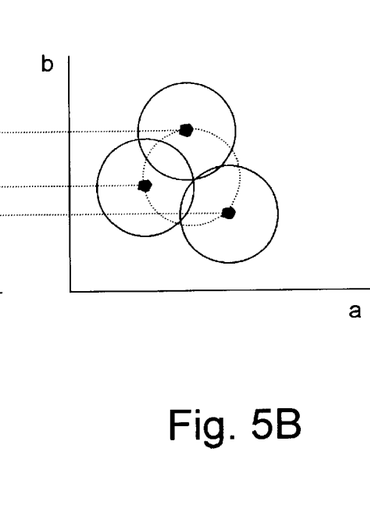

Consider N points in the x-y plane which lie on a circle of radius r as shown in FIG. 5A. As described above, the Hough Transform of each point is a circle in the a-b plane, as shown in FIG. 5B.

Each point on any of these circles in the a-b plane corresponds to a single circle in the x-y plane. If the N circles in the a-b plane intersect at a point, then this point is the mapping in the a-b plane of that circle in the x-y plane which contains all N points. In practice, the intersection points are detected using an accumulator, which divides the a-b plane into a grid. Each point which is on a circle produces a vote in a cell in the accumulator. Cells with a large number of votes correspond to an intersection point, which means that a circle, or arc of a circle, is present in the image in the x-y plane.

Use of the Hough Transform to Detect a Circle of Unknown Radius Detecting a circle of any radius in the x-y plane is somewhat more complex than described above. In this case, each point in the x-y plane maps to a cone in three-dimensional Hough space, i.e., a-b-r space. A circle is detected where a group of cones intersect. In this case, the accumulator is three-dimensional as well.

III. Application of the Hough Transform to Modeling Road Geometry

Figure 6A:
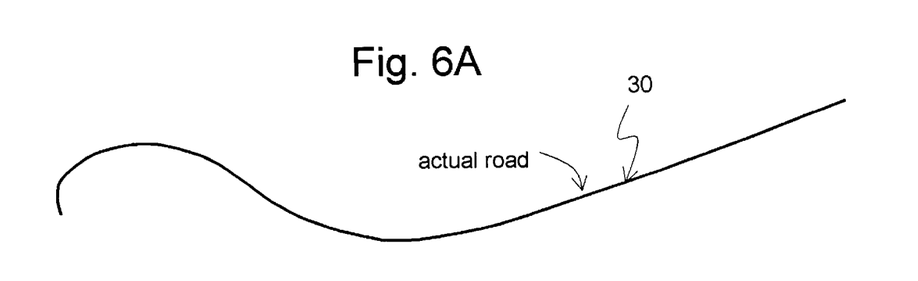
FIG. 6A is an illustration of a road segment.
Figure 6B:
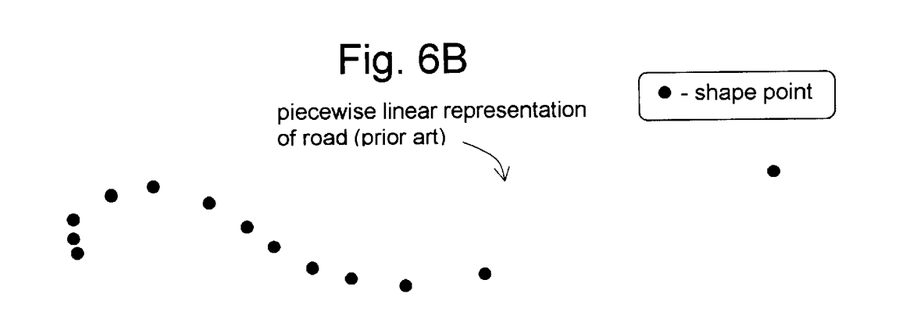
FIG. 6B illustrates a conventional way of representing the road segment in FIG. 6A.
Figure 6C:
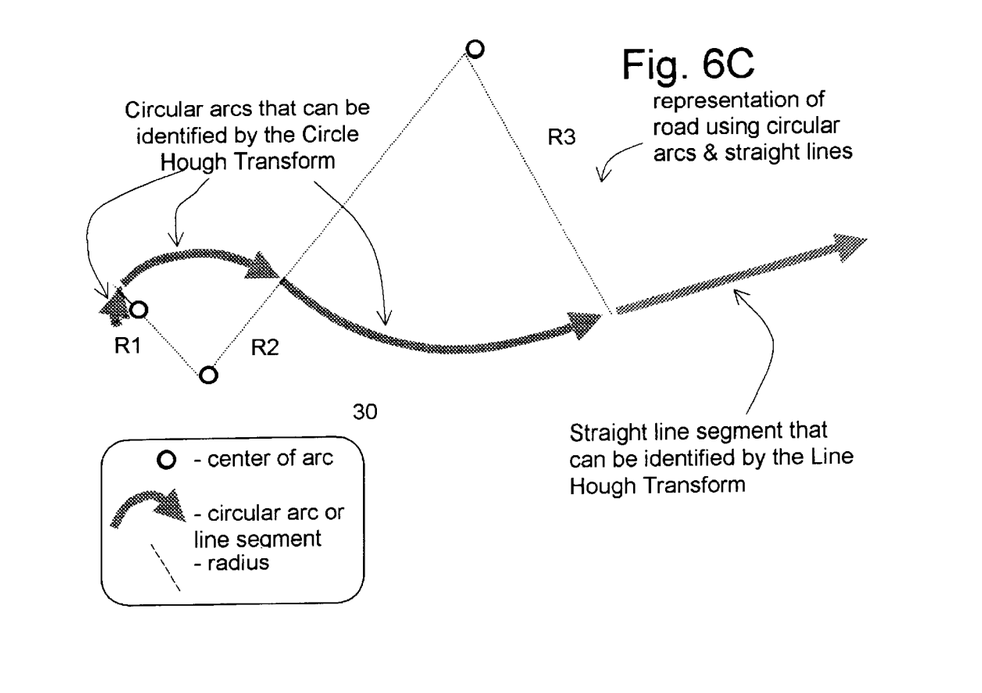
FIG. 6C illustrates a way to represent the road segment in FIG. 6A, according to an embodiment of the present invention.

FIG. 6A shows an actual road segment 30. FIG. 6B shows how the actual road segment 30 is represented in a conventional database, i.e., with shape points. The Hough transform can be used to identify all circular arcs (both center and radius) and line segments (slope and intercept) of which the road segment 30 in FIG. 6A is comprised. Some post processing may be used to determine the start and end points of each arc. The horizontal component of the road segment can then be modeled by the circular arcs and straight line segments alone, instead of using a list of shape points and nodes. FIG. 6C shows graphically how the road segment is represented using circular arcs. Thus, the horizontal curves of roads will be expressed in closed form (i.e., via a mathematical expression) using this method.

Figure 7:
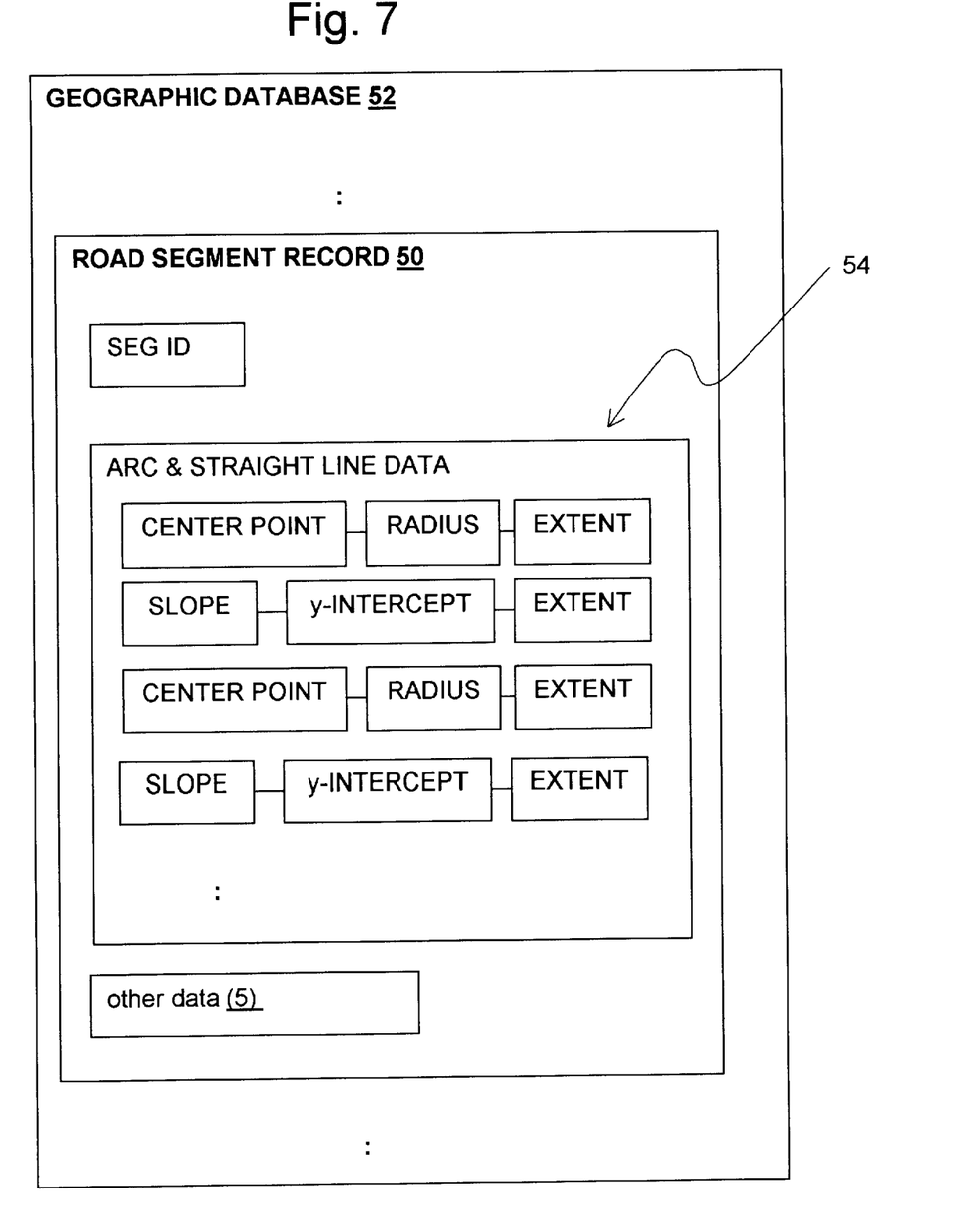
FIG. 7 is a diagram that shows components of a data record that represents a road segment.
Figure 8:
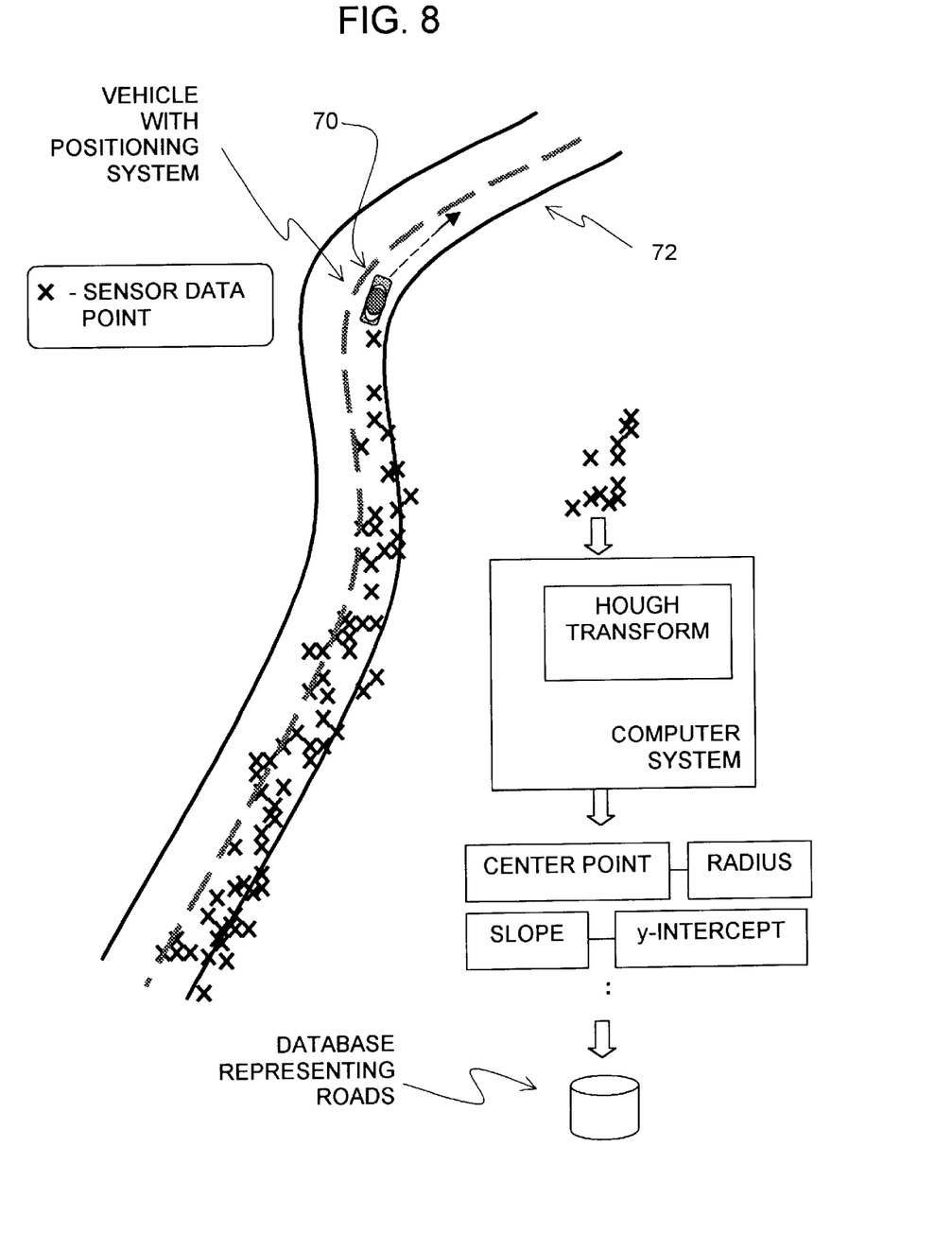
FIG. 8 is a diagram illustrating how a computer system using the Hough Transform can use position data collected by a vehicle to produce a geographic database that represents roads using arcs.

FIG. 7 shows components of a data entity (or record) 50 contained in a geographic database 52. The data entity or record 50 represents a road segment, such as the road segment 30 in FIG. 6A. The components of the data entity 50 include attributes (i.e., fields, etc.) that describe features or aspects of the road segment 30. Among the aspects of the road segment that are represented by the attributes of the data entity 50 are attributes 54 that represent the geometry (i.e., shape) of the road segment 30. In FIG. 7, the geometry of the road segment is represented using one or more circular arcs and straight line segments. Each arc is represented by a center point and a radius. Each straight line segment is represented by a slope and y-intercept. The data record 50 may include information that indicates the extent of each arc and line segment that corresponds to the represented road segment 30. The extent may be indicated by endpoints, range of degrees, or in other ways. Other information may be associated with some-or all the arcs and line segments.

Advantages

One, advantage of using circular arcs and straight line segments (obtained using the Hough Transform) for representing the horizontal component of road geometry is that less data may be needed to represent roads with a desired level of accuracy. Thus, use of arcs and line segments obtained with the Hough Transform may be a more space efficient way to represent road geometry, because such a representation directly exploits the piecewise circular arc design of roads. Furthermore, the new representation is in closed form.

Another advantage of using the Hough Transform to determine arcs for representing road geometry is that the Hough Transform uses points along roads as an input. For purposes of representing road geometry, points that correspond to locations along a road segment can be obtained in various ways.

One way to obtain points that corresponds to locations along a road segment is to use a positioning system located in a vehicle. FIG. 6 shows a vehicle 70 traveling along a road 72. The vehicle 70 includes a positioning system that collects data indicating the positions of the vehicle as it travels along the road 72. The positioning system may use known technology, such as GPS, dead reckoning, or a combination thereof, to obtain the positions of the vehicle as it is being driven along roads in a geographic area. The positioning system may be part of a navigation system or may be a standalone system. The vehicle may be a data collection vehicle operated specially by a geographic database developer to collect position data along roads. Alternatively, the vehicle may be an end user's vehicle (i.e., a probe or floating car) that collects vehicle position data as it is being driven by the end user in normal everyday usage. Methods for collecting data using end users' vehicles are described in U.S. Pat. No. 6,047,234, the entire disclosure of which is incorporated by reference herein.

The points corresponding to locations along a road used as an input to the Hough Transform may be obtained from other sources. For example, points corresponding to locations along roads may be obtained from maps (paper or digital), photographs (aerial or satellite), or digital images. Locations along roads on maps, photographs, or images may be determined automatically (e.g., using shape detection techniques) or by direct observation by a human operator.

Other sources of points corresponding to locations along roads include existing digital maps. As mentioned above, existing digital maps may represent roads using shape points (e.g., the coordinates of points located along roads). These points may be used as an input to the Hough Transform thereby converting a digital database that represents roads using shape points to a digital database that represents roads using arcs.

Alternatives

In the above described embodiments, the Hough Transform was used to identity the circular arcs and straight lines that coincide with the horizontal components of roads. In an alternative embodiment, if the horizontal component of a road is described by a geometric shape other than a circular arc or a straight line, an appropriate Hough Transform can be used to determine the formula for such a geometric shape. For example, in some locations, a road (or a portion thereof) may be designed to have a clothoid shape. In this case, an appropriate Hough Transform may be used to identify the parameters of the clothoid that coincides with the road and data indicating the parameters are stored in a geographic database to represent the road.

IV. Application of the Hough Transform to Obtaining Radius of Curvature Values

As described above, the Hough Transform identifies the circular arcs and straight line segments that coincide with a road segment. Once the arcs have been identified, the radius of curvature is also obtained, almost as a by-product of the transformation. Furthermore, portions of the road that are found to coincide with straight line segments have infinite radius of curvature. Hence, the Hough Transform can be used for computing radius of curvature of road segments.

V. Application of the Hough Transform to Obtaining Heading Values

As described above, the Hough Transform identifies the circular arcs and straight line segments which comprise a road segment. Using this method, the shape of the road is expressed in closed form. Therefore, the value of heading can be directly obtained from this closed form representation by computing the tangent to the closed form representation. Thus, heading can be accurately obtained at any point along a road.

It is intended that the foregoing detailed description be regarded as illustrative rather than limiting and that it is understood that the following claims including all equivalents are intended to define the scope of the invention.

I claim:

1. A method of representing the horizontal component of roads in a geographic database comprising:

providing data indicating a plurality of locations along a road;

using the data as an input to a Hough Transform to determine circular arcs and straight line segments that coincide with the road; and storing data that define said arcs and line segments to represent the horizontal component of the road in the geographic database.

2. The method of claim 1 wherein said data indicating a plurality of locations along a road are obtained using a positioning system located in a vehicle that travels along the road.

3. The method of claim 2 wherein said vehicle is a probe vehicle.

4. The method of claim 2 wherein said vehicle is operated by a geographic database developer.

5. The method of claim 1 wherein the data that define said circular arcs comprise center points and radii.

6. The method of claim 1 wherein the data that define said line segments comprise slope and intercept.

7. The method of claim 1 wherein the data that define said circular arcs further comprise data that indicate end points of the arcs.

8. The method of claim 1 wherein the data that define said line segments further comprise data that indicates the end points of the segments.

9. The method of claim 1 wherein said data indicating a plurality of locations along a road are obtained by digitizing photographs or maps.

10. The method of claim 1 wherein the geographic database is used by an adaptive cruise control system in an automobile.

11. The method of claim 1 wherein the geographic database is used by an adaptive lighting control system in an automobile.

12. The method of claim 1 further comprising:
determining a value of the curvature at locations along the road using the data that define said circular arcs and straight line segments.

13. The method of claim 1 further comprising:
determining a value of the heading at locations along the road using the data that define said circular arcs and straight line segments.

14. A geographic database formed according to the process of claim 1.

* * * * *